(12) United States Patent
Pal et al.

(10) Patent No.: US 6,890,028 B2
(45) Date of Patent: May 10, 2005

(54) HEADREST APPARATUS FOR VEHICLE

(75) Inventors: Chinmoy Pal, Kanagawa (JP); Izumi Kobayashi, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 19 days.

(21) Appl. No.: 10/314,392

(22) Filed: Dec. 9, 2002

(65) Prior Publication Data

US 2003/0122409 A1 Jul. 3, 2003

(30) Foreign Application Priority Data

Dec. 27, 2001 (JP) ........................................ 2001-397412

(51) Int. Cl.$^7$ ............................................ B60R 21/055
(52) U.S. Cl. .................................. 297/216.12; 297/408
(58) Field of Search ............................ 297/391, 216.12, 297/408

(56) References Cited

U.S. PATENT DOCUMENTS

| | | | | |
|---|---|---|---|---|
| 2,828,810 A | * | 4/1958 | Barecki et al. | ............. 297/396 |
| 3,645,556 A | * | 2/1972 | Kobori | .................. 297/216.12 |
| 4,693,515 A | * | 9/1987 | Russo et al. | ................. 297/391 |
| 4,856,848 A | * | 8/1989 | O'Sullivan et al. | ......... 297/391 |
| 6,082,817 A | * | 7/2000 | Muller | .................. 297/216.12 |
| 6,270,161 B1 | * | 8/2001 | De Filippo | ................. 297/410 |
| 6,474,733 B1 | | 11/2002 | Heilig et al. | |
| 6,511,130 B2 | * | 1/2003 | Dinkel et al. | ................ 297/410 |
| 6,550,856 B1 | * | 4/2003 | Ganser et al. | .............. 297/408 |
| 2001/0040396 A1 | | 11/2001 | Kreuels et al. | |

FOREIGN PATENT DOCUMENTS

| | | |
|---|---|---|
| DE | 299 07 245 U1 | 9/1999 |
| EP | 1 122 122 A1 | 8/2001 |
| FR | 2 802 484 A1 | 6/2001 |
| JP | 6-59163 U | 8/1994 |
| JP | 7-291005 A | 11/1995 |

* cited by examiner

*Primary Examiner*—Peter R. Brown
(74) *Attorney, Agent, or Firm*—Foley & Lardner LLP

(57) ABSTRACT

A vehicle headrest apparatus includes a headrest member including a head restraint section to restrain the head of a seat occupant; and a forward move mechanism to move the head restraint section forward in case of a rear end collision of a vehicle. There is further provided an inclining mechanism to incline the head restraint section forward during a forward movement of the head restraint section, by increasing an amount of a forward movement of an upper part of the head restraint section greater than an amount of a forward movement of a lower part of the head restraint section.

21 Claims, 18 Drawing Sheets

FIG.12A          FIG.12B
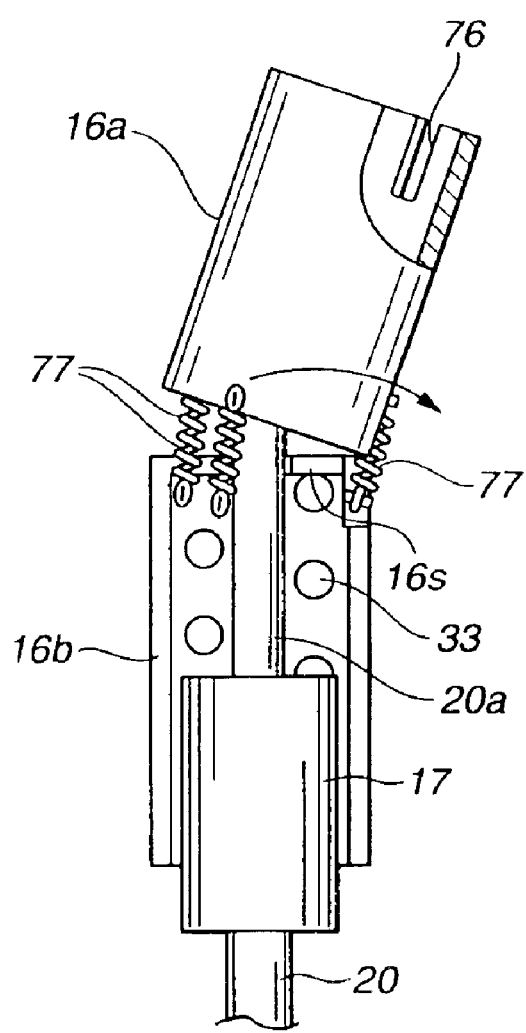
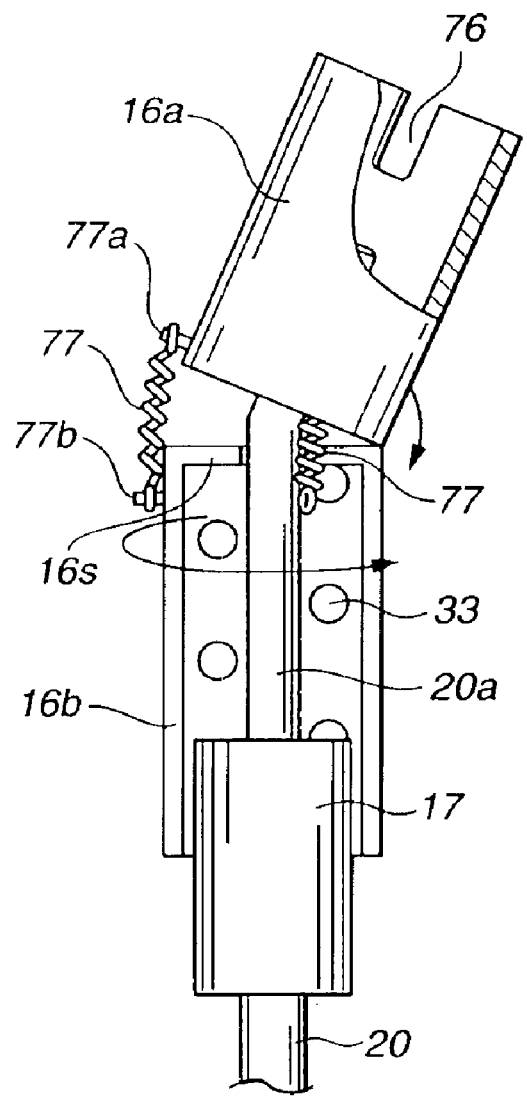

FIG.16A      FIG.16B
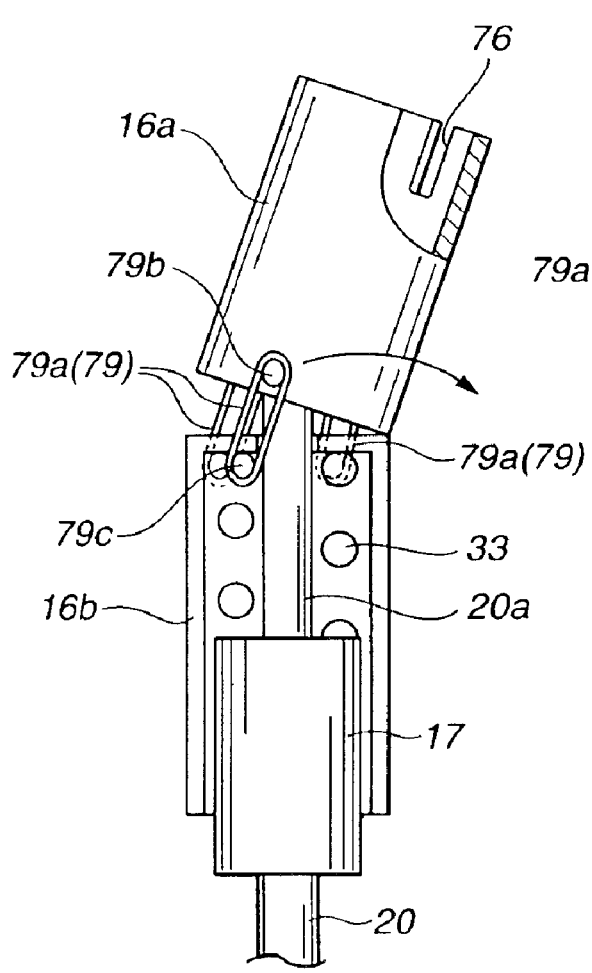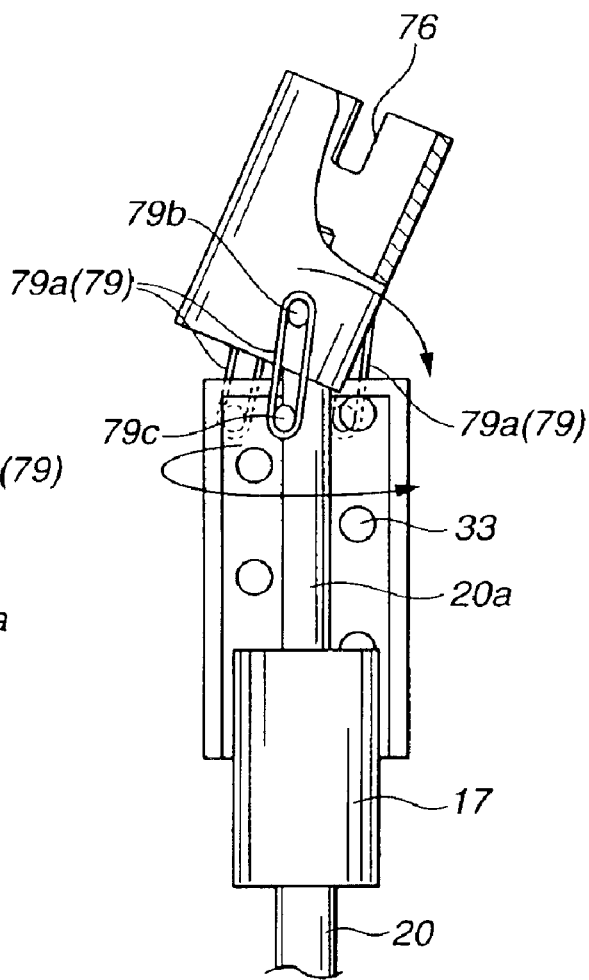

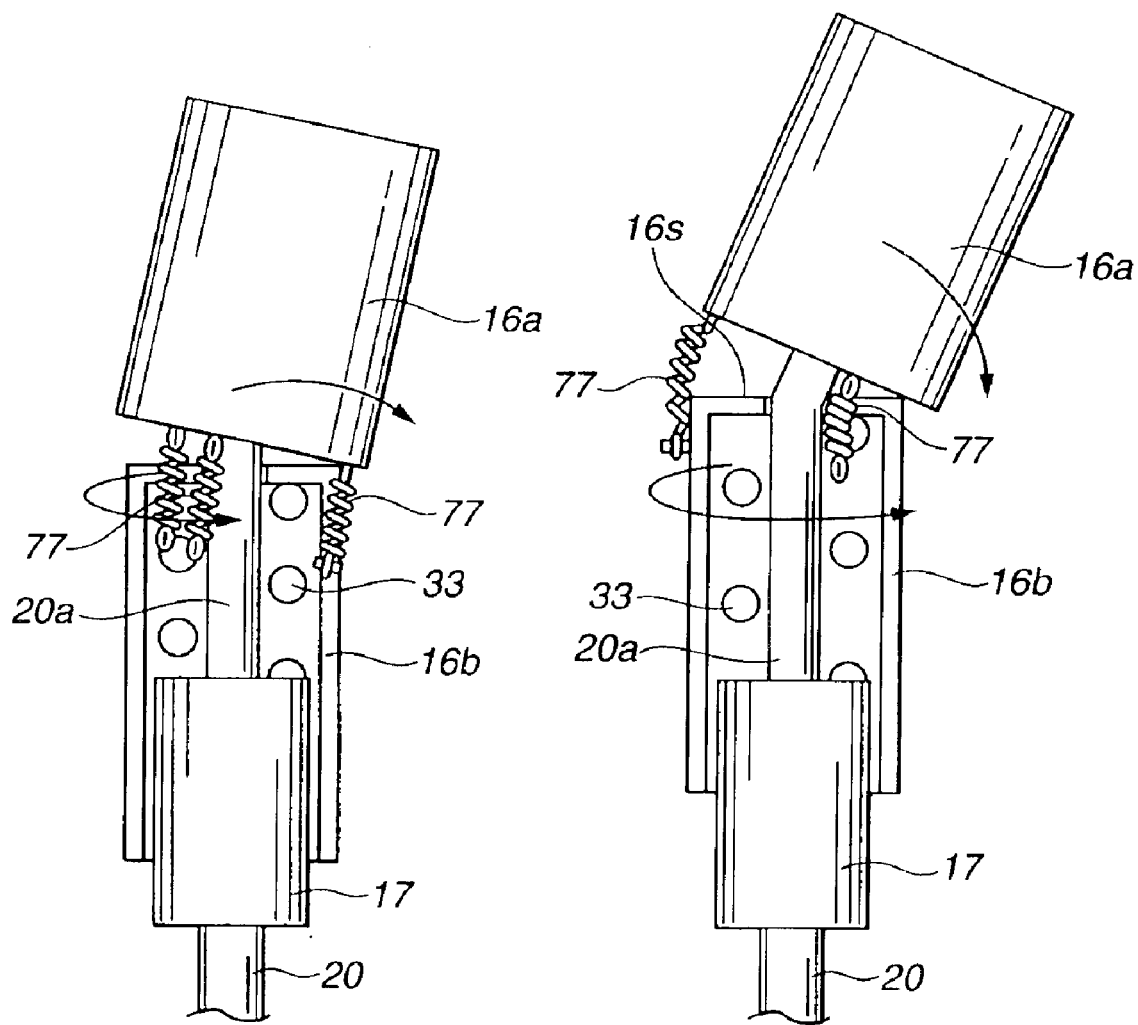

HEADREST APPARATUS FOR VEHICLE

BACKGROUND OF THE INVENTION

The present invention relates to a headrest apparatus for a vehicle such as motor vehicle.

Published Japanese Patent Application Kokai No. H07 (1995)-291005 shows a vehicle seatback system designed to restrain the head of a seat occupant in case of a rear end collision of a vehicle. This seatback system responds to a dynamic load of the occupant by the inertia in a rear end collision, and moves a headrest forward through headrest support arms.

Published Japanese Utility Model Publication Kokai No. H06(1994)-59163 shows a system of an airbag disposed in a headrest and arranged to expand in response to a pressure applied on a seatback from a seat occupant in case of a rear end collision.

SUMMARY OF THE INVENTION

However, the above-mentioned seatback system tends to delay in activation because of a time interval from a collision until the detection of the resulting rearward occupant movement, and the airbag system is undesirable in the noise of explosion for deployment of the airbag near the ears of the seat occupant.

It is an object of the present invention to provide a headrest apparatus for restraining the head of a vehicle seat occupant reliably at an earlier stage of a rear end collision.

According to the present invention, a headrest apparatus comprises: a headrest member to be mounted on top of a seatback of a vehicle seat, the headrest member including a head restraint section to restrain the head of a seat occupant; a forward move mechanism to move the head restraint section forward in case of a rear end collision of the vehicle, and thereby to shift forward a support point to support the head of the seat occupant against a rearward movement of the head of the seat occupant; and an inclining section to incline the head restraint section forward during a forward movement of the head restraint section caused by the forward move mechanism, by increasing an amount of a forward movement of an upper part of the head restraint section greater than an amount of a forward movement of a lower part of the head restraint section.

The other objects and features of this invention will become understood from the following description with reference to the accompanying drawings.

BRIEF DESCRIPTION OF THE DRAWINGS

FIGS. 12A and 12B are views for illustrating inclination of the upper piece shown in FIG. 11.

FIGS. 16A and 16B are views for illustrating inclination of the upper piece shown in FIG. 15.

FIGS. 18A and 18B are views for illustrating inclination of the upper piece shown in FIG. 17.

DETAILED DESCRIPTION OF THE INVENTION

FIGS. 1~9 show a headrest apparatus 10 according to a first embodiment of the present invention.

Figure 1:
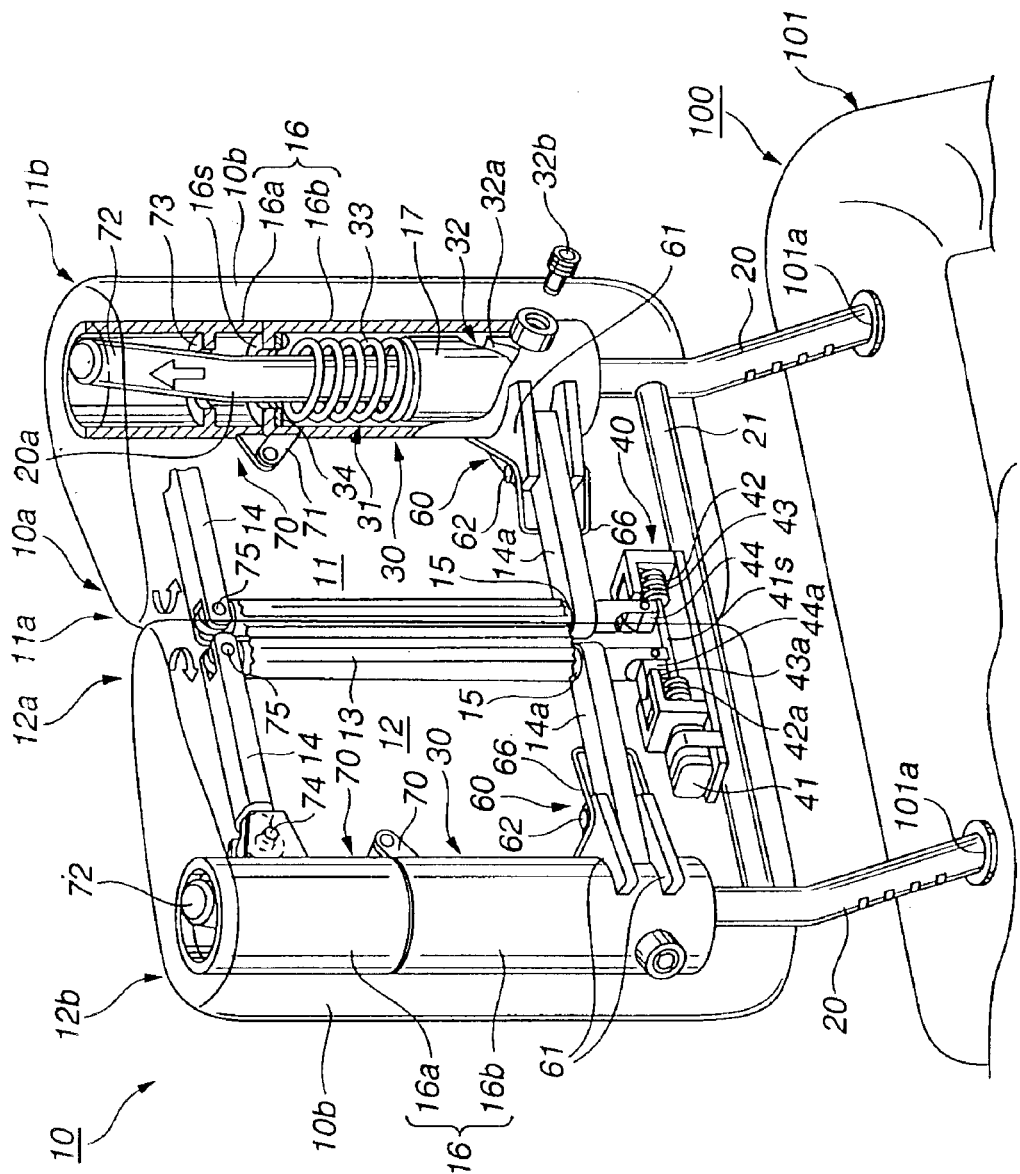
FIG. 1 is a perspective view partly in section for showing a headrest apparatus according to a first embodiment of the invention in an original or standard state.
Figure 2:
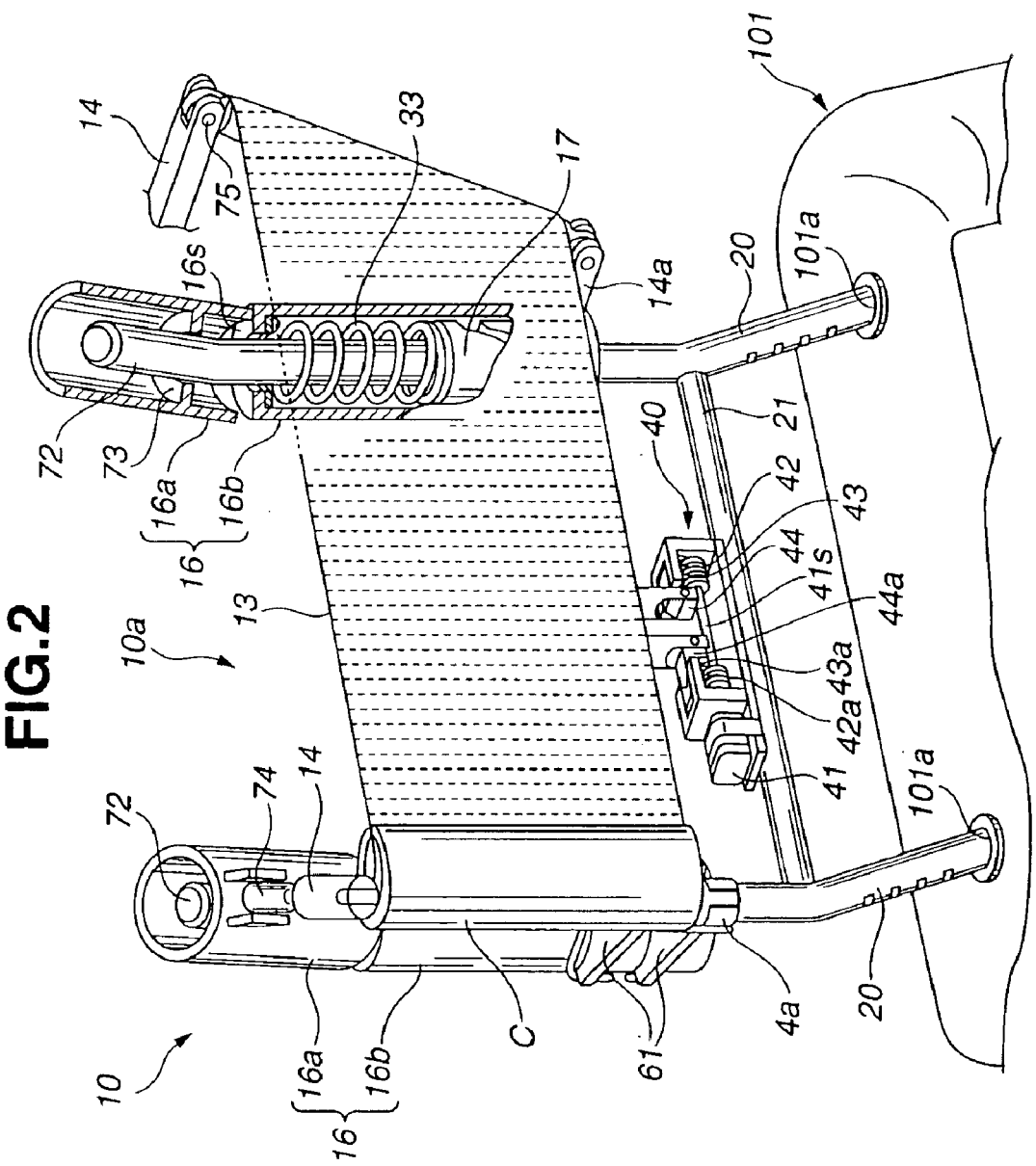
FIG. 2 is a perspective view partly in section for showing the headrest apparatus of FIG. 1, with cushion pad being removed, in a fully open or activated state for restraining the head of a seat occupant at a forward position.
Figure 3:
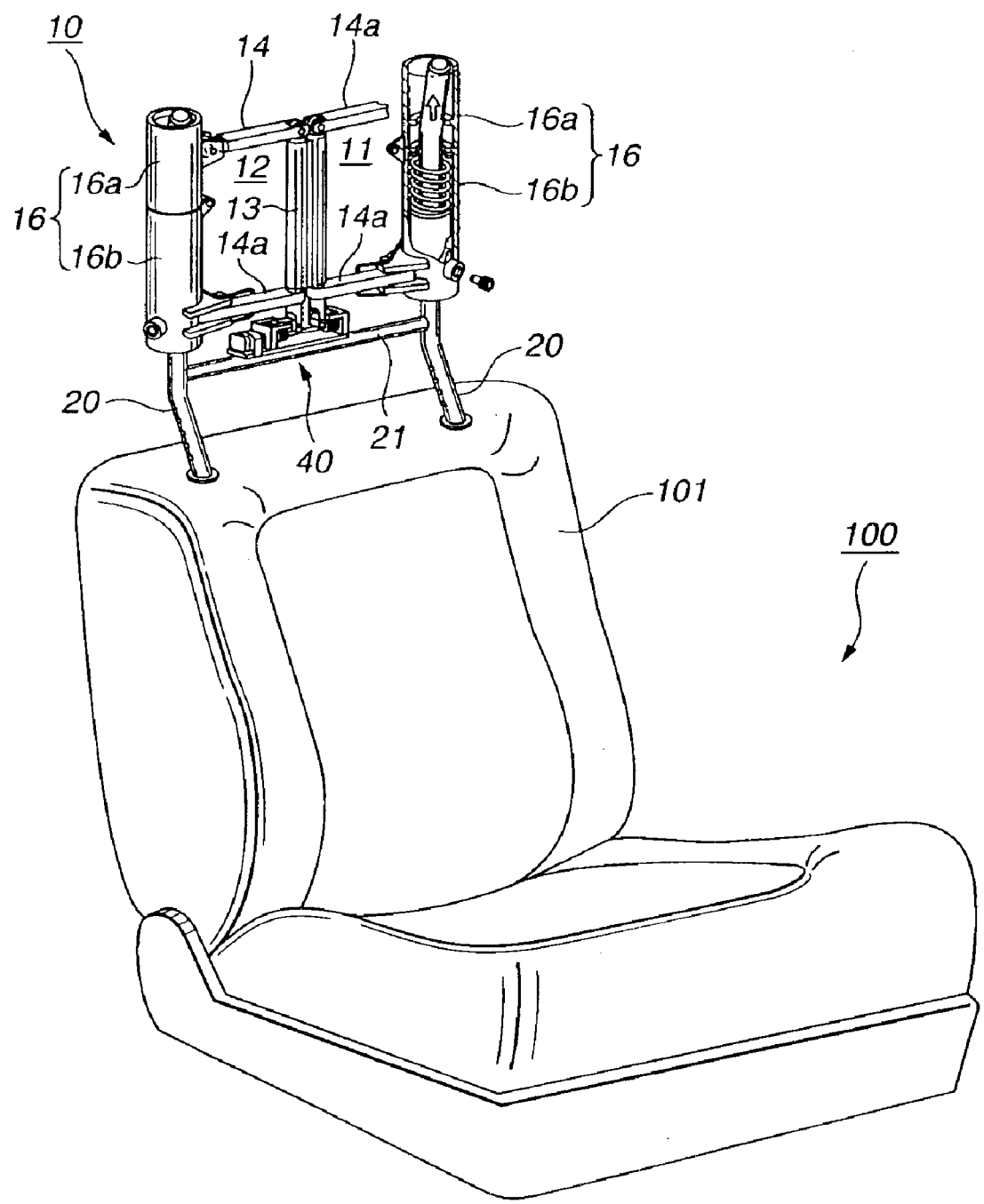
FIG. 3 is a perspective view showing a vehicle seat equipped with the headrest apparatus of FIG. 1.

As shown in FIGS. 1~3, headrest apparatus 10 is to be mounted on an uppermost portion of a seatback 101 of a seat 100 for a vehicle. Headrest apparatus 10 includes a headrest member (main member) 10a for supporting the head of a seat occupant. Headrest member 10a is mounted on seatback 101 through left and right mount members (guide members) 20 including lower segments inserted, respectively, into left and right mounting holes 110a formed in seatback 101. Each of left and right mount members 20 in this example is in the form of a stay or rod extending vertically or upwards from the uppermost portion of seatback 101 in the assembled state shown in FIG. 1. In this example, left and right stays 20 support headrest member 10a so that the position of headrest member 10a can be adjusted vertically.

A cross bar 21 extends in a left and right direction (the lateral direction of the vehicle) between left and right upright stays 20, and connects the lower segments of left and right upright stays 20. The left and right ends of cross bar 21 are welded, respectively, to left and right stays 20. Each stay 20 includes an upper segment 20a extending upwards from the joint portion with cross bar 21, and supporting one side of headrest member 10a.

Headrest member 10a includes left and right half members 11 and 12, and a thin flexible member (or membrane member) 13 serving as a head restraint section. Each of left and right half members 11 and 12 includes an inner end (or swing end) 11*a* or 12*a* and an outer end (support end) 11*b* or 12*b* supported by upper segment 20*a* of stay on the left or right side. In the original or standard state shown in FIG. 1, inner ends 11*a* and 12*a* extend side by side vertically at the middle between left and right stays 20. Thin flexible member 13 is connected between inner (swing) ends 11*a* and 12*a* of left and right half members 11 and 12.

Outer (support) end 11*b* or 12*b* of each half member 11 or 12 is mounted rotatably on upper segment 20*a* of the corresponding stay 20 through a rotation urge mechanism or forward move mechanism 30 for serving as means for moving the head restraint section forward toward the front of the vehicle.

Each of left and right half members 11 and 12 includes an approximately rectangular frame or skeleton formed by an upper lateral arm 14 extending laterally, a lower lateral arm 14*a* extending laterally below the upper lateral arm 14, a vertical end member 15 extending substantially vertically at the inner swing end, and an outer cylinder (pivot member or rotation center member) 16 extending substantially vertically at the outer support end. This skeleton is enclosed by a cushion pad 10*b* as shown in FIG. 1.

Thin flexible member 13 extends from a left end wound around vertical end member 15 of left half member 11, to a right end wound around vertical end member 15 of right half member 12. Cushion pad 10*b* of each half member 11 or 12 is formed with a vertically extending slit through which thin flexible member 13 is drawn out.

Outer cylinder 16 on each side is fit over an inner cylinder 17 fixedly mounted on a lower portion of upper segment 20*a* of the corresponding stay 20. In this example, inner cylinder 17 serves as a portion of the guide member. Outer cylinder 16 is mounted on inner cylinder 17 so that outer cylinder can rotate and move axially (or vertically) on inner cylinder 17. Therefore, left and right half members 11 and 12 are pivotally mounted on inner cylinders 17, respectively so that left and right half members 11 and 12 can be swung open forward like a casement window.

In a fully open state as shown in FIG. 2 in which left and right half members 11 and 12 are swung forward to a preset maximum angle, vertical end members 15 of left and right half members 11 and 12 jut forward (toward the front of the vehicle) at left and right positions spaced by a predetermined distance from each other in the left and right direction (the lateral direction of the vehicle). Between the thus-spaced vertical end members 15 of left and right half members 11 and 12 in the fully open state, thin flexible member 13 is spread to a maximum extent.

Each vertical end member 15 is provided with a winding mechanism which is covered with a fringe member C of elastomeric material such as rubber, having a C-shaped cross section. When fringe member C is pressed backward toward the rear of the vehicle, by the head of the seat occupant, the fringe member C clamps thin flexible member 13 and locks thin flexible member 13 to prevent flexible member 13 from being pulled out from the winding mechanism.

Rotation urge mechanism 30 on each side includes a lift mechanism 31 for lifting the left or right half member 11 or 12 upward along stay 20, and a rotation mechanism 32 for guiding the left or right half member 11 or 12 and thereby causing the left or right half member 11 or 12 to swing forward during the upward movement by lift mechanism 31.

Lift mechanism 31 on each side includes a spring 33 disposed under compression between the upper end of inner cylinder 17 and an annular inward flange 16*s* formed integrally in outer cylinder 16. A washer 34 is interposed between spring 33 and inward flange 16*s* to improve the slippage. Spring 33 of lift mechanism 33 disposed in outer cylinder 16 always applies an upward urging force for moving a corresponding one of left and right half members 11 and 12 upward.

Rotation mechanism 32 on each side is composed of a helical groove 32*a* formed in the outside surface of inner cylinder 17 as shown in FIG. 1, and a bolt 32*b* serving as an engaging member (or sliding or follower member), provided in outer cylinder 16, and arranged to slide along the helical groove 32*a* of inner cylinder 17 so as to guide the left or right half member 11. Helical grooves 32*a* are so curved in inner cylinders 17 on the left and right sides as to cause left and right half members 11 and 12 to swing open forward.

When left and right half members 11 and 12 are moved upward by the forces of springs 33 of lift mechanisms 31, bolts 32*b* of rotation mechanisms 32 move upward along the respective helical grooves 32*a* of inner cylinders 17. As a result, outer cylinders 16 integral, respectively, with bolts 32*b*, are rotated in the direction to swing left and right half members 11 and 12 forward to the open position.

Therefore, by setting the groove geometry or the angle of inclination of helical grooves 32*a*, it is possible to set the amount of rotation of left and right half members 11 and 12 in advance. Helical grooves 32*a* make it possible to adjust the amount of rotation of left and right half members 11 and 12 with respect to the amount of upward movement of left and right half members 11 and 12.

In this embodiment, there is further provided an inclining mechanism 70 for inclining thin flexible member 13 to a bowing posture at the time of rotational movement of left and right half members 11 and 12 to the open position, by making the amount of forward movement of upper lateral arm 14 than the amount of forward movement of lower lateral arm 14*a*.

To form the inclining mechanism 70, each of outer cylinders 16 is composed of an upper hollow cylindrical piece 16*a* and a lower hollow cylindrical piece 16*b* connected by a connecting member which, in this embodiment, is in the form of a hinge 71. Hinge 71 joins the lower end of upper piece 16*a* swingably with the upper end of lower piece 16*b* and allows the upper end of upper piece 16*a* to swing forward. In this embodiment, upper lateral arm 14 is supported by upper piece 16*a*, and lower lateral arm 14*a* is supported by lower piece 16*b*. In this embodiment, inward flange 16*s* is formed at the upper end of lower piece 16*b*.

Figure 8:
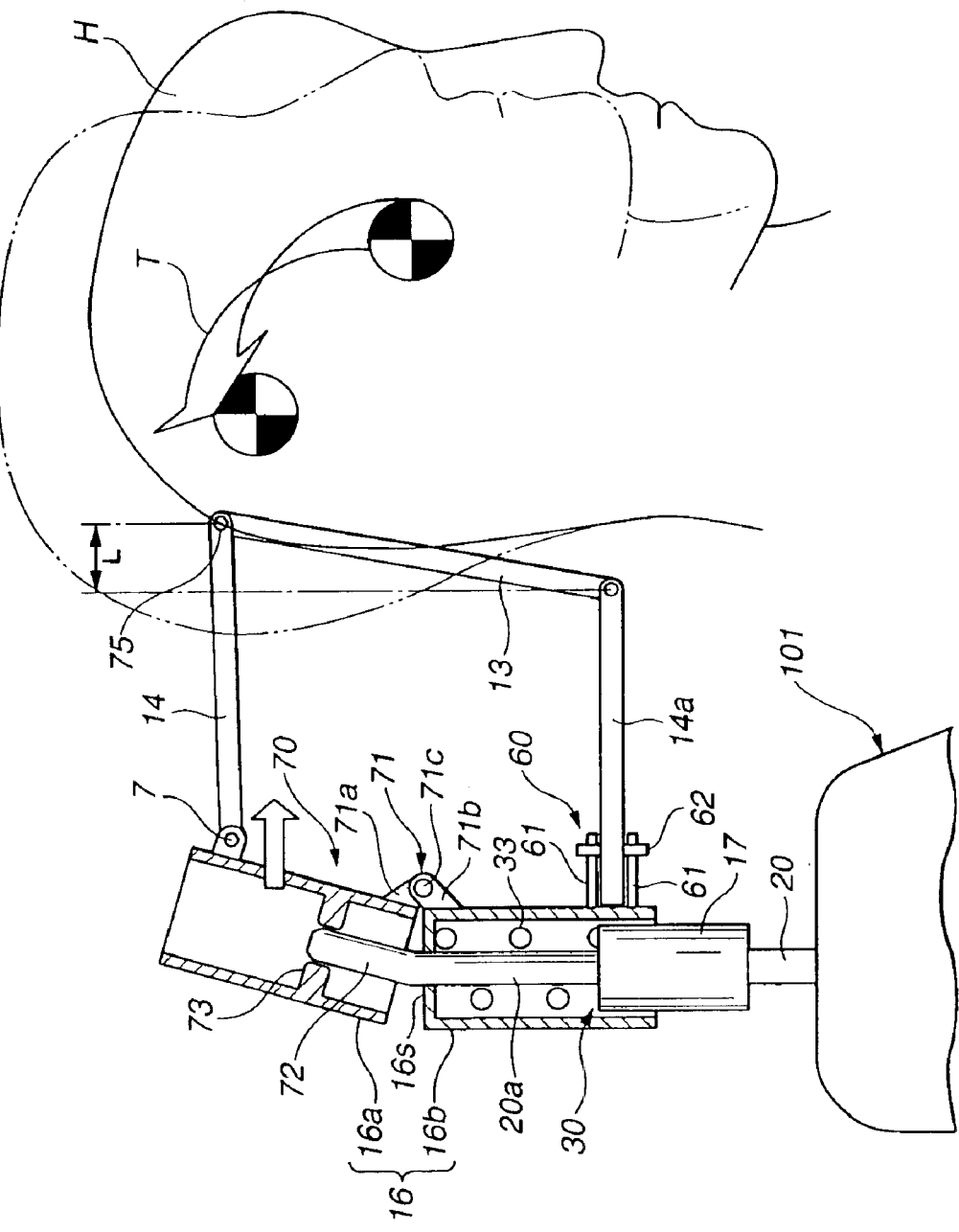
FIG. 8 is a side sectional view showing the headrest member of FIG. 1 in a state restraining the head of a seat occupant.

On each of the left and right sides, hinge 71 connects upper and lower pieces 16*a* and 16*b* with each other, at a position just below the outer end of upper lateral arm 14, and allows upper piece 16*a* to bend forward with respect to lower piece 16*b*. In this embodiment, as shown in FIG. 8, hinge 71 is composed of an upper hinge bracket 71*a* projecting forward (in the state of FIG. 8) from upper piece 16*a*, a lower hinge bracket 71*b* projecting forward (in the state of FIG. 8) from lower piece 16*b*, and a hinge pin 71*c* swingably connecting upper and lower hinge brackets 71*a* and 71*b*.

Inclining mechanism 70 is composed of stay (or guide member) 20 extending upward in lower piece 16*b* and upper piece 16*a* of outer cylinder 16, and including an upper guide portion 72 inclined forward so as to bend upper piece 16*a* forward. Upper guide portion 72 is an upper part of upper segment 20*a* of stay 20. Upper piece 16*a* is formed with a guide ring 73 in the form of an inward flange fitting over the forward inclined upper guide portion 72 slidably in a manner of sliding fit. When outer cylinder 16 is moved upward, this guide ring 73 slides on upper guide portion 72.

Figure 4:
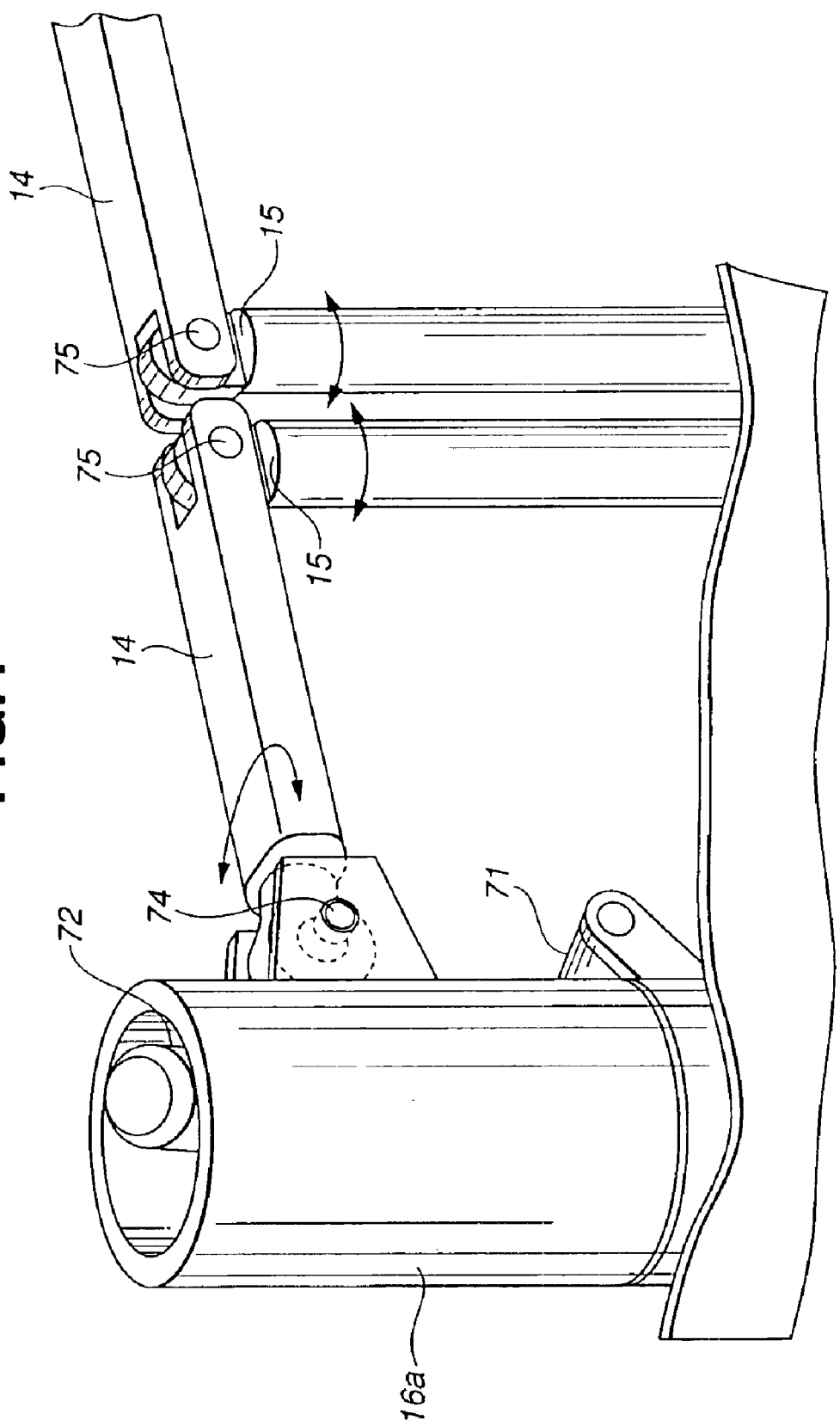
FIG. 4 is an enlarged perspective view showing an upper portion of the headrest apparatus of FIG. 1.

To allow smooth inclination of upper piece 16a, the outer end of upper lateral arm 14 is connected with upper piece 16a through a ball joint 74, as shown in FIG. 4, and the inner end of upper lateral arm 14 is connected with vertical end member 15 through a pin 75. Therefore, upper lateral arm 14 is swingable up and down. Outer circumference of vertical end member 15 is rotatable, and forms the mechanism for winding thin flexible member 13.

A lock mechanism 40 for serving as means for locking left and right members 11 and 12 against the resilient force of rotation urge mechanisms 30 is provided on the middle of cross bar 21 extending laterally between left and right stays 20, as shown in FIGS. 1 and 2. Lock mechanism 40 holds left and right members 11 and 12 in the standard or original state shown in FIG. 1.

Figure 5:
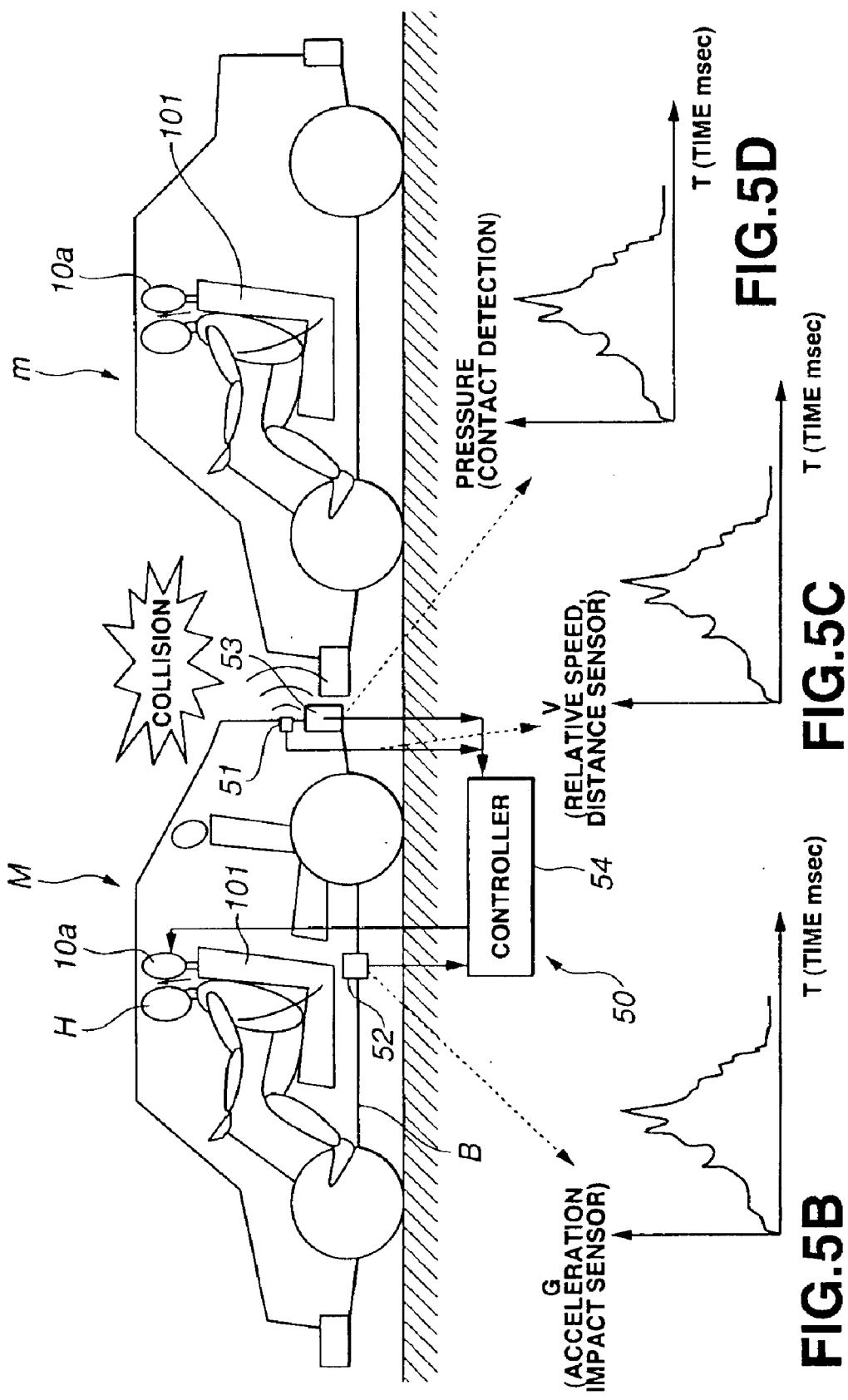
FIGS. 5A, 5B, 5C and 5D are views for showing a controlling system of a controller and sensors for the headrest apparatus of FIG. 1.

A control section 50 is arranged to unlock left and right half members 11 and 12 when a rear end collision of the vehicle M is detected, as shown in FIG. 5.

As shown in FIGS. 1~3, lock mechanism 40 includes a motor 41 serving as driving means; first and second worm gears 42 and 42a mounted on a rotation shaft of motor 41; first and second racks 43 and 43a moved in the left and right direction by the rotation of worm gears 42 and 42a; and first and second engaging members 44 and 44a for unlocking left and right half members 11 and 12 with the movement of racks 43 and 43a.

A set of worm gear 42 or 42a, rack 43 or 43a and engaging member 44 or 44a is provided for each of left and right half members. The helical directions of worm gears 42 and 42a for left and right half members 11 and 12 are opposite to each other, and both worm gears 42 and 42a are driven by the single common motor 41.

By being driven by the application of current outputted by control section 50 in case of rear end collision, motor 41 moves left and right racks 43 and 43a in a direction away from each other, and thereby unlock the lock mechanism 40 by releasing engaging members 44 and 44a.

Control section 50 of this embodiment, as shown in FIGS. 5A~5D, includes a V sensor 51 provided in the rear end of the vehicle M for sensing a relative distance to a following vehicle m by using sound wave or the like, a G sensor 52 for sensing an acceleration applied on a vehicle body B of vehicle M, a pressure sensor 53 provided in a rear bumper of vehicle M for sensing a contact pressure from following vehicle m, and a controller 54 for receiving signals from these sensors. In accordance with the sensor signals from sensors 51, 52 and 53, controller 54 detects a rear end collision of vehicle M, and unlocks the lock mechanism 40 by supplying current to motor 41. G sensor 52 and pressure sensor 53 are effective for sensing an actual impact of a rear end collision. It is possible to employ one or more other sensors such as a touch sensor and strain gage in place of or in addition to these illustrated sensors. Moreover, it is possible to employ a lock mechanism of any of various other types. For example, it is optional to employ a lock mechanism using a solenoid.

In this example shown in FIG. 1, there is further provided, in each rotation mechanism 32, a fixing mechanism 60 for fixing the corresponding left or right half member 11 or 12 to the stay 20 by a rearward pushing force applied to the half member 11 or 12.

Figure 6:
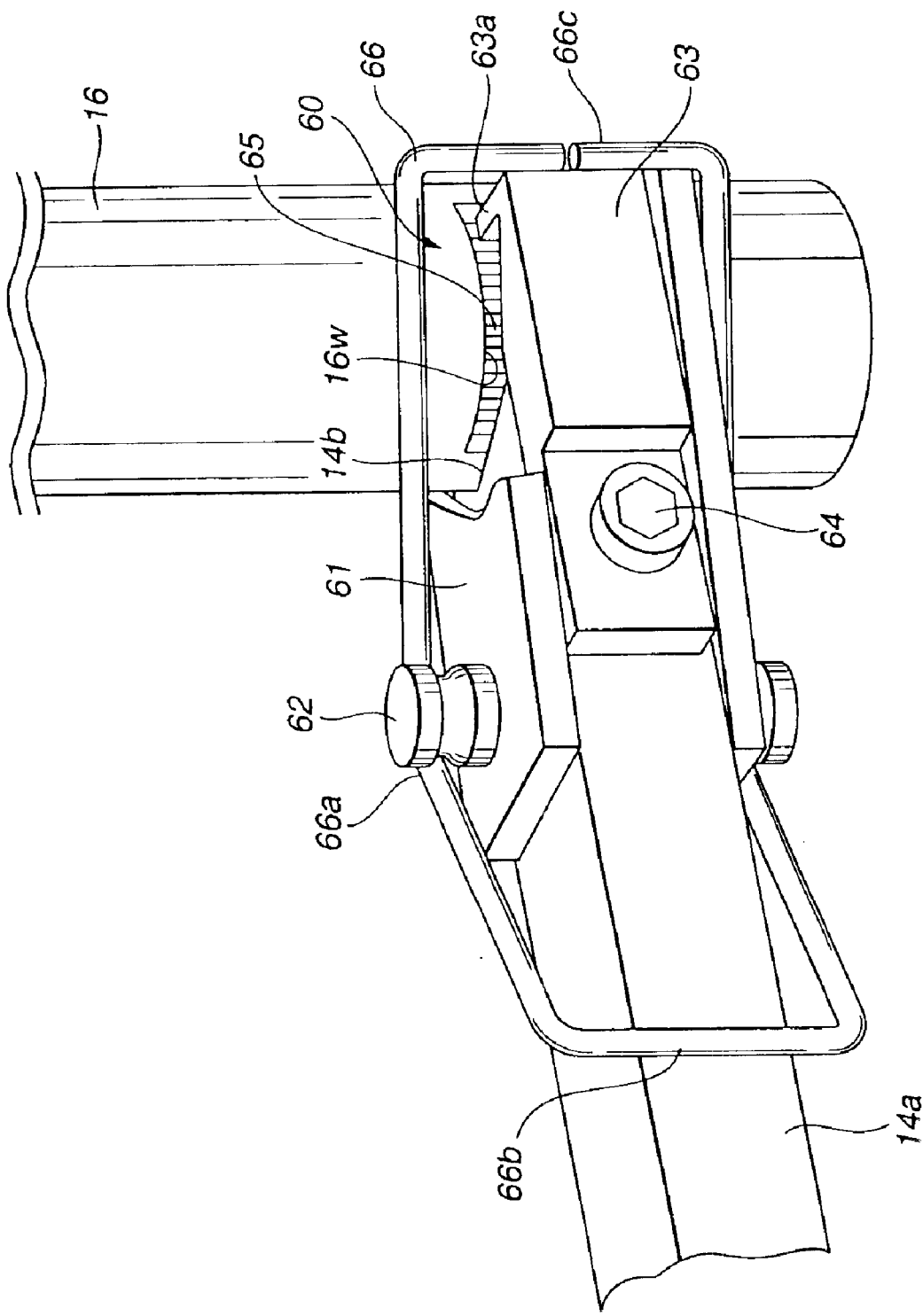
FIG. 6 is a perspective view showing a rear side of a fixing mechanism of the headrest apparatus of FIG. 1.
Figure 7:
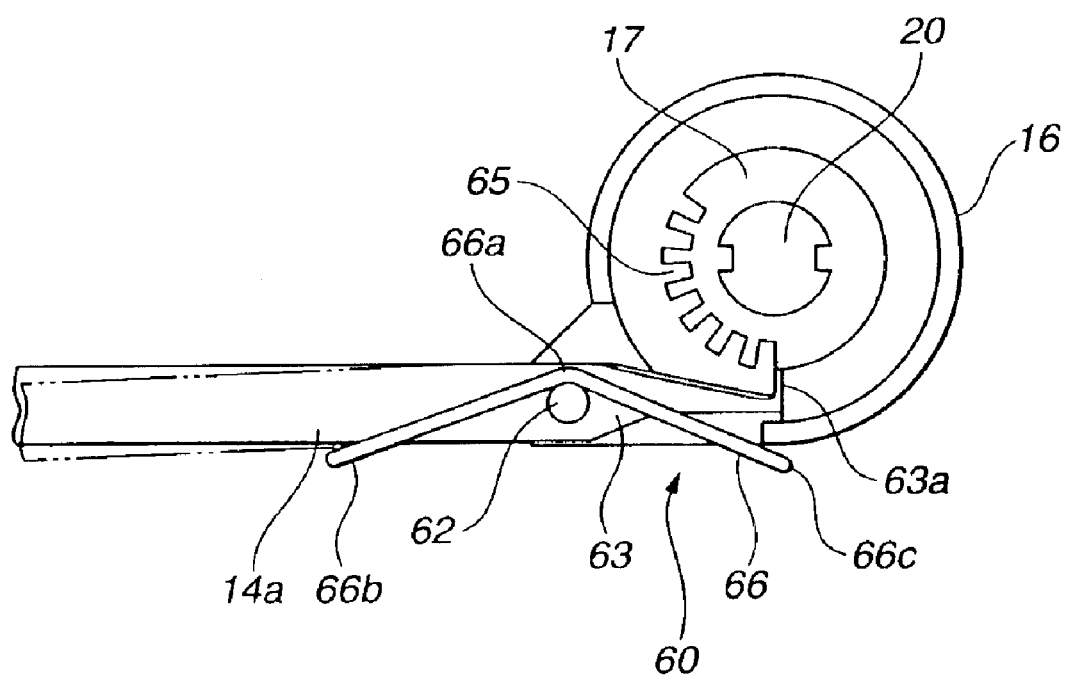
FIG. 7 is a sectional view showing a part of the fixing mechanism of FIG. 6.

As shown in FIGS. 6 and 7, lower lateral arm 14a is rotatably connected with lower piece 16b of outer cylinder 16 through a vertical pin 62 supported by a bracket 61 fixed to lower piece 16b. An engaging member 63 is fixed to the outer end of lower lateral arm 14a by a bolt 64. Engaging member 63 projects to a center portion of lower piece 16b. Lower piece 16b is formed with a window 16w for receiving a claw 63a of engaging member 63. Claw 63a projects perpendicularly from the forward end of engaging member 63 toward the center of lower piece 16b.

On the other hand, inner cylinder 17 is formed with a rack portion 65 having teeth arranged in the circumferential direction. Claw 63a of engaging member 63 can engage with rack portion 65 through window 16w. In this examples, the teeth of rack portion 65 are formed over the entire length of inner cylinder 17.

A spring 66 is disposed between lower lateral arm 14 and lower piece 16b of outer cylinder 16, and arranged to push lower lateral arm 14a forward toward the front of the vehicle. Spring 66 of this example is in the form of wire rod of spring steel shaped like a rectangle. Spring 66 includes two long parallel segments extending in the left and right direction so as to form two parallel side of the rectangle. The two long parallel segments of spring 66 are bent about the middle so as to form a V shape of an obtuse angle. A bent portion 66a of spring 66 is retained by the front side of pin 62, and used as a fulcrum. A first end 66b of spring 66 abuts on the rear side of lateral arm 14a, and a second end 66c of spring 66 abuts on the rear side of lower piece 16b of outer cylinder 66. Thus, spring 66 is arranged to apply a forward resilient force between both ends 66b and 66c.

By the resilient force of spring 66 of fixing mechanism 32, lateral arms 14a are normally swung forward about pin 62, and claws 63a of engaging members 63 are disengaged from the respective racks 65. Therefore, each outer cylinder 16 is held rotatable freely relative to inner cylinder 17.

Lateral arm 14a is formed with a V-shaped recess 14b, as shown in FIG. 6. The amount of rotation of lateral arm 14a about pin 62 is limited within a small range determined by abutment of one side of the V-shaped recess 14b against the outside circumferential surface of lower piece 16b of outer cylinder 16.

When a rearward pushing force is applied to at least one of left and right half members 11 and 12 of headrest member 10a by the head H of the seat occupant, lateral arm 14a is rotated rearward against the force of spring 66, and claw 66a of engaging member 66 is engaged with rack 65. By this engagement, engaging member 66 locks outer cylinder 16 to inner cylinder 17.

When the following vehicle m collides against the rear of the controlled vehicle M as shown in FIG. 5, controller 54 detects the occurrence of a rear end collision from the signals from sensors 51, 52 and 53, and unlocks the locking by lock mechanism 40 by supplying current to motor 41.

Then, left and right half members 11 and 12 are moved upward from the original or standard position with the respective outer cylinders 16 by the force of springs 33 of lift mechanism 31, and at the same time left and right half members 11 and 12 are rotated forward by bolts 32b sliding in helical grooves 32a of rotation mechanism 32.

With the forward rotation of left and right half members 11 and 12, thin flexible member 13 is drawn out from the winding mechanisms of vertical end members 15, and spread wide by left and right vertical end members 15, as shown in FIG. 2.

During the upward movement of outer cylinder 16 on each side, upper piece 16a moves upward together with lower piece 16b, and upper piece 16a bends forward in a smooth manner by being guided by the forward inclined upper guide portion 72 of stay (or guide member) 20 through guide ring 73.

Therefore, the amount of movement of upper lateral arm 14 connected with upper piece 16a becomes greater than the amount of movement of lower lateral arm 14a by the amount determined by the forward inclination. Consequently, as shown in FIG. 8, the forward (inner) end of upper arm 14 projects forward beyond the forward (inner) end of lower arm 14a by a distance L. In the fully spread state of thin flexible member 13 shown in FIG. 2, the upper end of flexible member 13 juts forward beyond the lower end of flexible member 13. In this state, thin flexible member 13 forms a substantially flat inclined surface. The inclined state of upper piece 16a can be locked by the frictional force between guide ring 73 and upper inclined guide portion 72 of stay 20.

Therefore, the upper part of thin flexible member 13 can support occupant's head H moved rearward at an earlier stage. At the same time, the inclined surface of thin flexible member 13 can securely restrain head H which is moved along a curved line T like an arc of a circle or an ellipse after the rear end collision, and thereby prevent head H from being moved over thin flexible member 13.

Left and right half members 11 and 12 swing forward and hold thin flexible member 13 at a forward position located ahead of stays 20. Accordingly, thin flexible member 13 can support head H at the forward position in front of stays 20, and restrain head H with the inclined form earlier in a reliable manner.

In this embodiment, headrest apparatus 10 employs a sensor (such as sensors 51, 52 and 53) for detecting a rear end collision, instead of a sensor for detecting a load change or shift of the seat occupant due to the inertia. Therefore, the spreading operation of headrest member 10a is triggered securely and promptly irrespective of the weight and posture of the seat occupant. In this embodiment, there is no need for providing, in seat back 101, a mechanism for sensing the load change of seat occupant. Accordingly, it is possible to design comfortable and light-weight seat back 101 without undesired limitation on the width, height and shape of the seat back.

Figure 9:
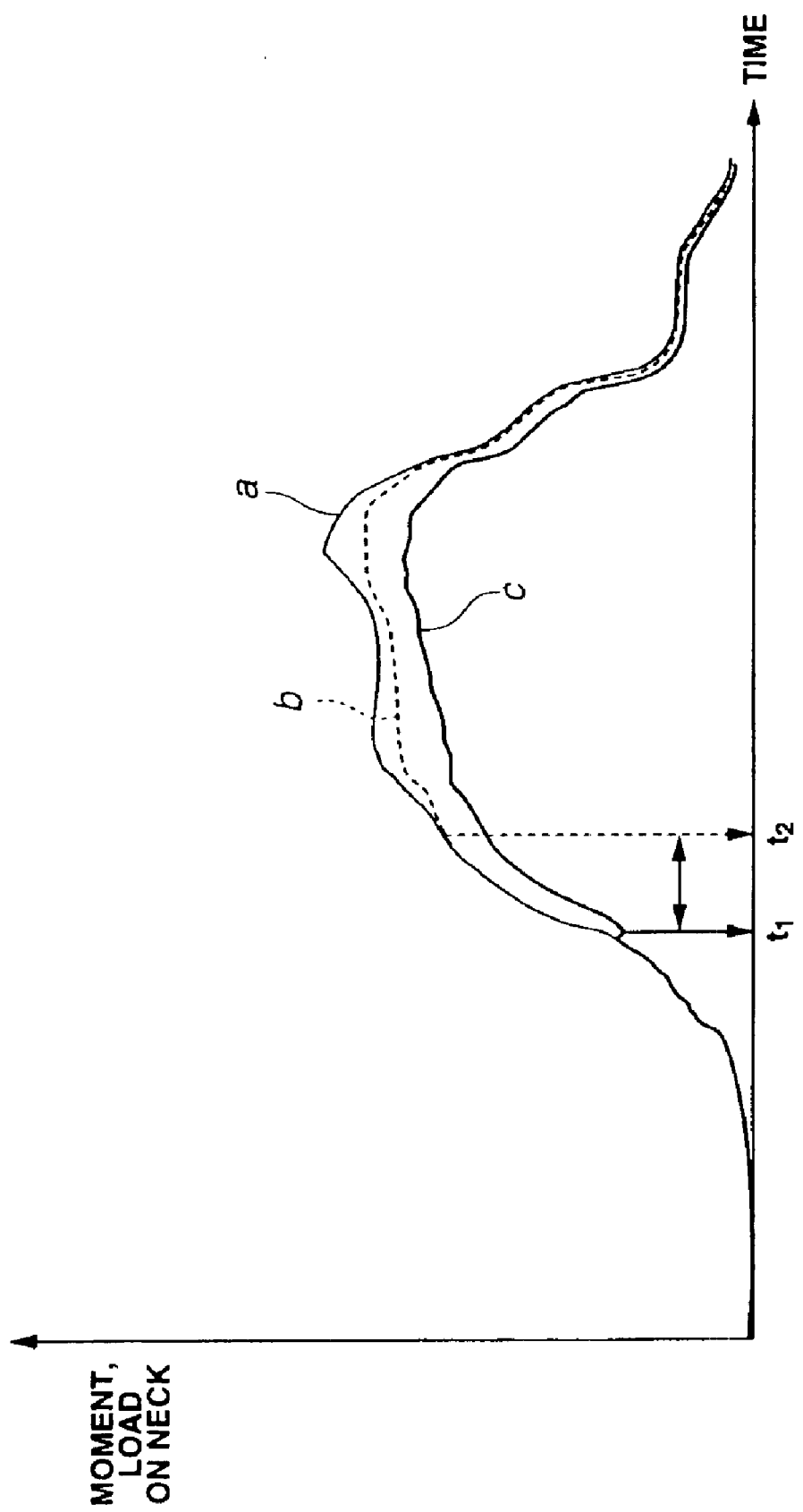
FIG. 9 is a graph showing a head restraining characteristic of the headrest apparatus of FIG. 1

FIG. 9 shows results obtained by experiment performed by using the headrest apparatus according this embodiment. A moment (load) applied to the neck of the occupant is expressed along a vertical axis in FIG. 9, and time is expressed along a horizontal axis. A line "a" shows a characteristic of an ordinary headrest apparatus of a first comparative example having no active headrest mechanism, a line "b" shows a headrest apparatus of a second comparative example having an active headrest system arranged to sense a load transfer of a seat occupant, and a line c shows a characteristic of headrest apparatus 10 according to this embodiment of the present invention.

Headrest apparatus of the second comparative example shown by line "b" is superior in the performance of restraining the occupant's head to the first comparative example of line "a". As compared to the second comparative example of line "b", the headrest apparatus according this embodiment shown by line "c" can initially touch the head at an earlier time point t1 earlier than a time point t2 of the second comparative example, and can reduce the maximum head load.

Figure 10:
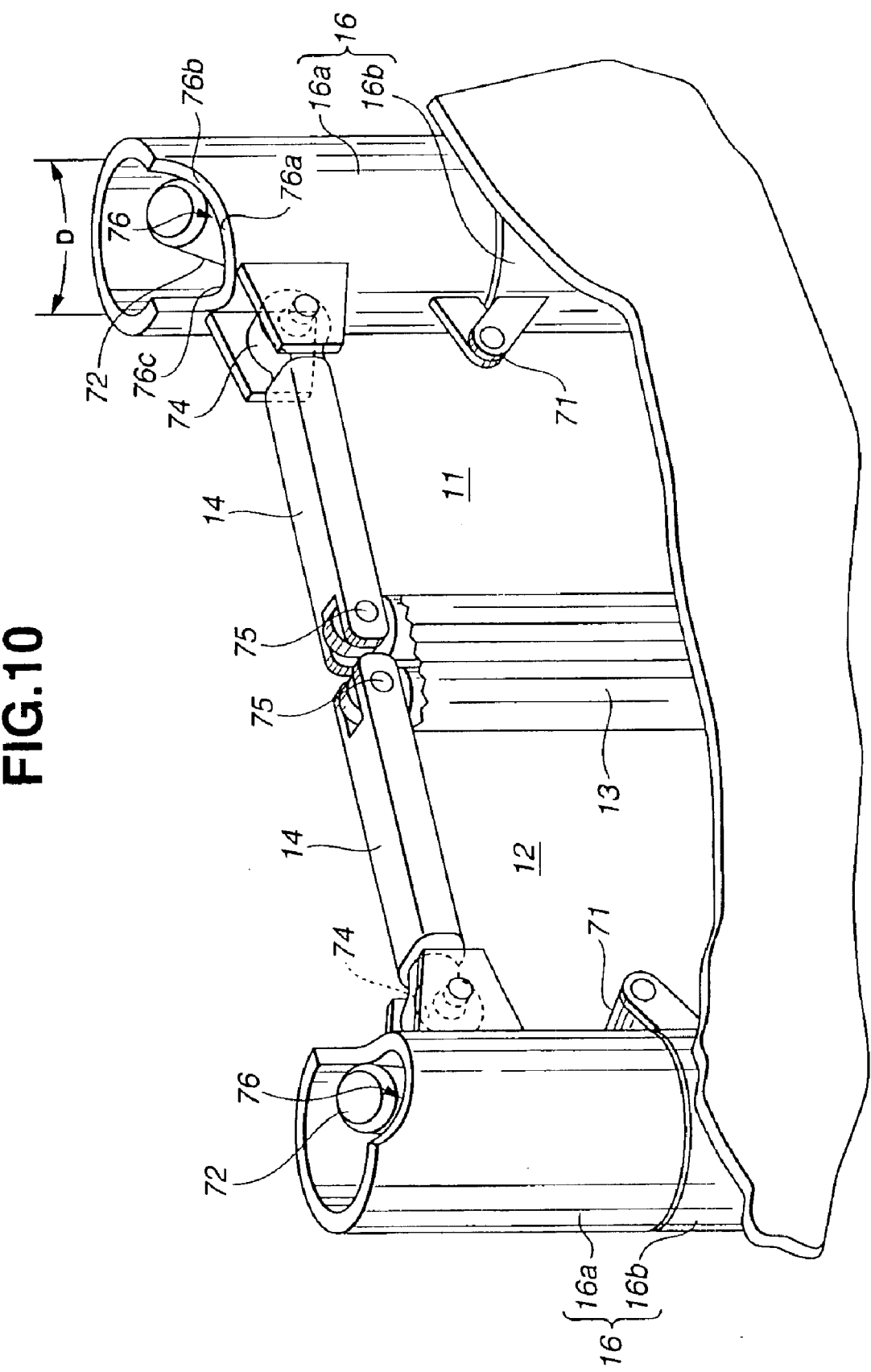
FIG. 10 is an enlarged perspective view showing a portion of a headrest apparatus according to a second embodiment in a state in which a cushion pad is removed.

FIG. 10 shows a main portion of a headrest apparatus according to a second embodiment of the present invention in the state in which cushion pad is removed. In most respects, the construction is substantially identical to that of FIG. 1, and corresponding parts are given the same reference numerals.

Upper piece 16a of outer cylinder (pivot member) 16 includes a recessed guide portion or cutout 76 formed in the upper end of upper piece 16a, and designed to receive and guide upper inclined guide portion 72 of stay 20 in a manner to avoid interference between upper piece 16a and the forward end of upper guide portion 72.

Recessed guide portion 76 extends circumferentially around the center line of cylindrical upper piece 16a, and the circumferential width D of recessed guide portion 76 is greater than the diameter of inclined upper guide portion 72. Recessed guide portion 76 has a bottom 76a smoothly sloping deeper from a shallow section 76b for receiving upper guide portion 72 in the original or standard state shown in FIG. 1, to a deep section 76c for receiving upper guide portion 72 when outer piece 16a is lifted upward with a forward rotation of the half member 11 or 12.

In this embodiment, it is possible to set the inclination angle of upper guide portion 72 of stay 20 at a greater angle without being limited by the inside space of upper piece 16a. In this case, the inclination mechanism can incline upper piece 16a to a greater inclination angle, and thereby incline the expanded thin flexible member 13 forward to a greater inclination angle. Accordingly, the second embodiment can expand the range of selection of the inclination angle of the expanded thin flexible member 13.

Figure 11:
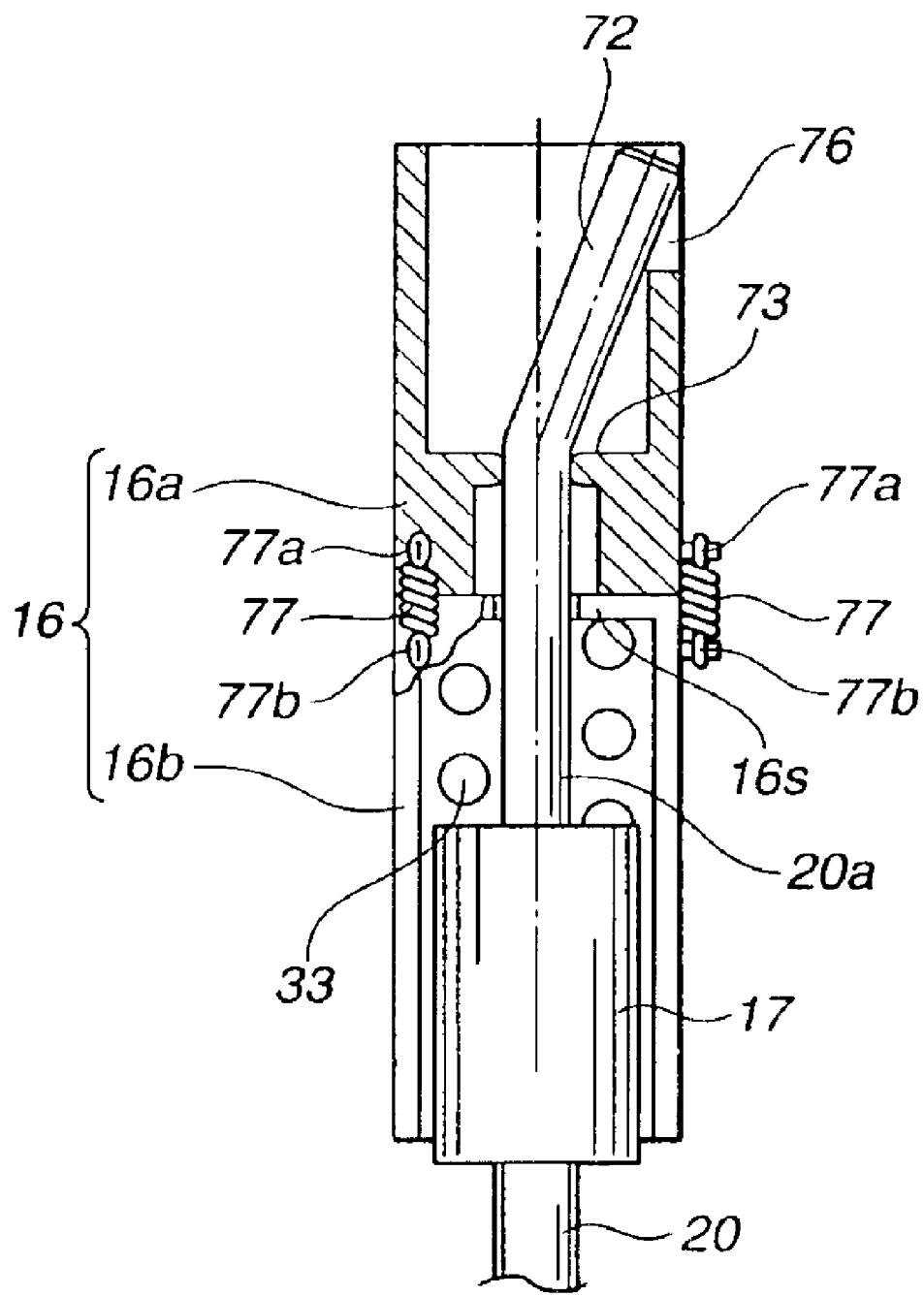
FIG. 11 is a sectional view showing a connecting structure between upper and lower pieces of an outer cylinder in a headrest apparatus according a third embodiment of the present invention.

FIGS. 11 and 12 (12A and 12B) show a main portion of a headrest apparatus according to a third embodiment of the present invention. The third embodiment is different from the first embodiment in the following points. In the other respects, the third embodiment is substantially identical to the first embodiment. Corresponding parts are given the same reference numerals, and repetitive explanation is omitted. In the third embodiment, the connecting member connecting upper and lower pieces 16a and 16b is a set of connecting springs 77, instead of hinge 71 of the first embodiment. In the state of FIG. 11, each of connecting springs 77 extends vertically along the center line or axis of outer cylinder 16. In the illustrated example, three upper hooks 77a are arranged regularly around the outer circumference of upper piece 16a near the lower end of upper piece 16a, and projected outward. Similarly, three lower hooks 77b are arranged regularly around the outer circumference of lower piece 16b near the upper end of lower piece 16b, and projected outward. Each of three connecting springs 77 extends from an upper spring end supported by one of upper hooks 77a, to a lower spring end supported by one of lower hooks 77b located just below the mating upper hook 77a in the state of FIG. 11.

When outer cylinder 16 is moved upward, upper piece 16a slides upward along the inclined upper guide portion 72 of stay 20 as shown in FIG. 12A and thereby bends forward to a forward inclined posture as shown in FIG. 12B. Springs 77 allow this inclination of upper piece 16a by expanding on the elongated side or the outer side of the bend. This arrangement of the third embodiment employing connecting springs 77 arranged around upper and lower pieces 16a and 16b is advantageous for size reduction and weight reduction of outer cylinder 16.

In this example, too, a recessed guide portion 76 is formed in the upper end portion of upper piece 16a, and arranged to receive the forward end of inclined upper guide portion 72 of stay 20, and thereby to allow upper piece 16a to incline largely. However, it is optional to omit recessed guide portion 76 in the third embodiment (and in fourth and fifth embodiments).

Figure 13:
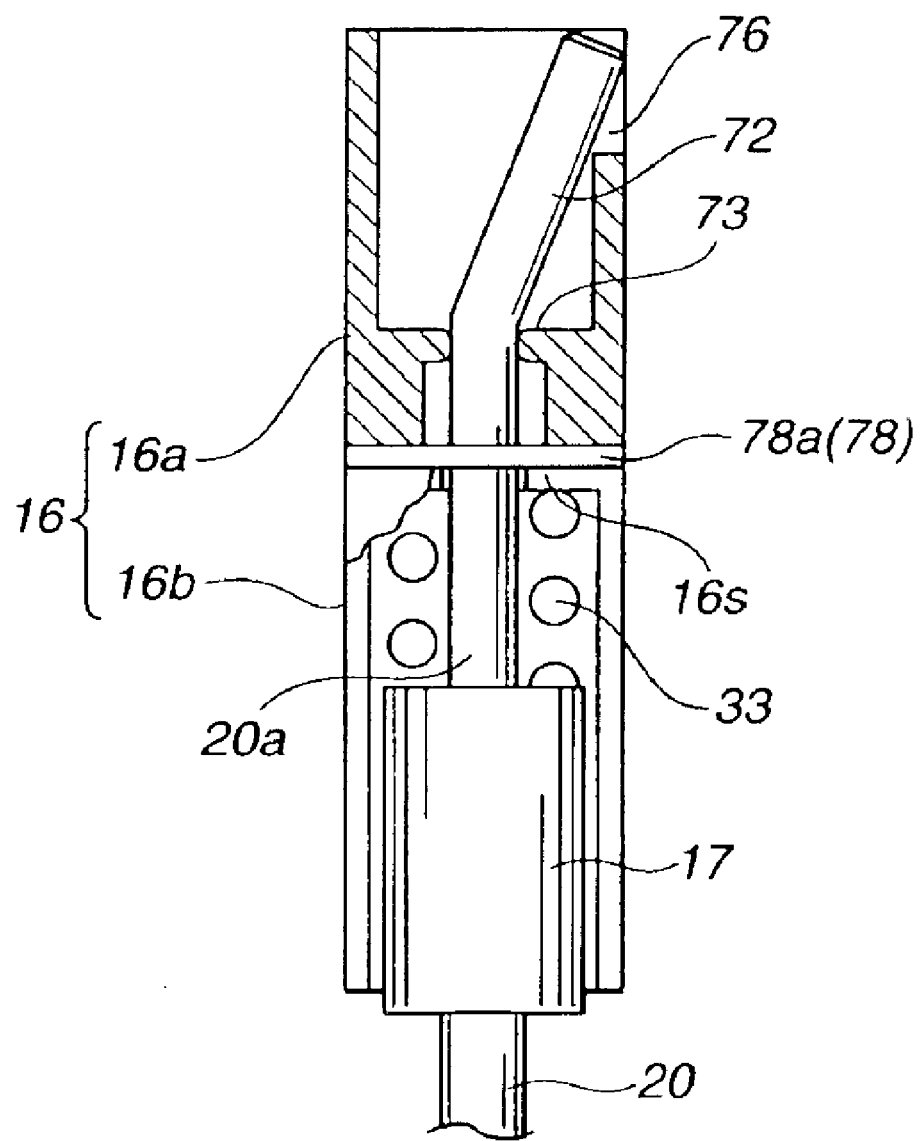
FIG. 13 is a sectional view showing a connecting structure between upper and lower pieces of an outer cylinder in a headrest apparatus according a fourth embodiment of the present invention.
Figure 14:
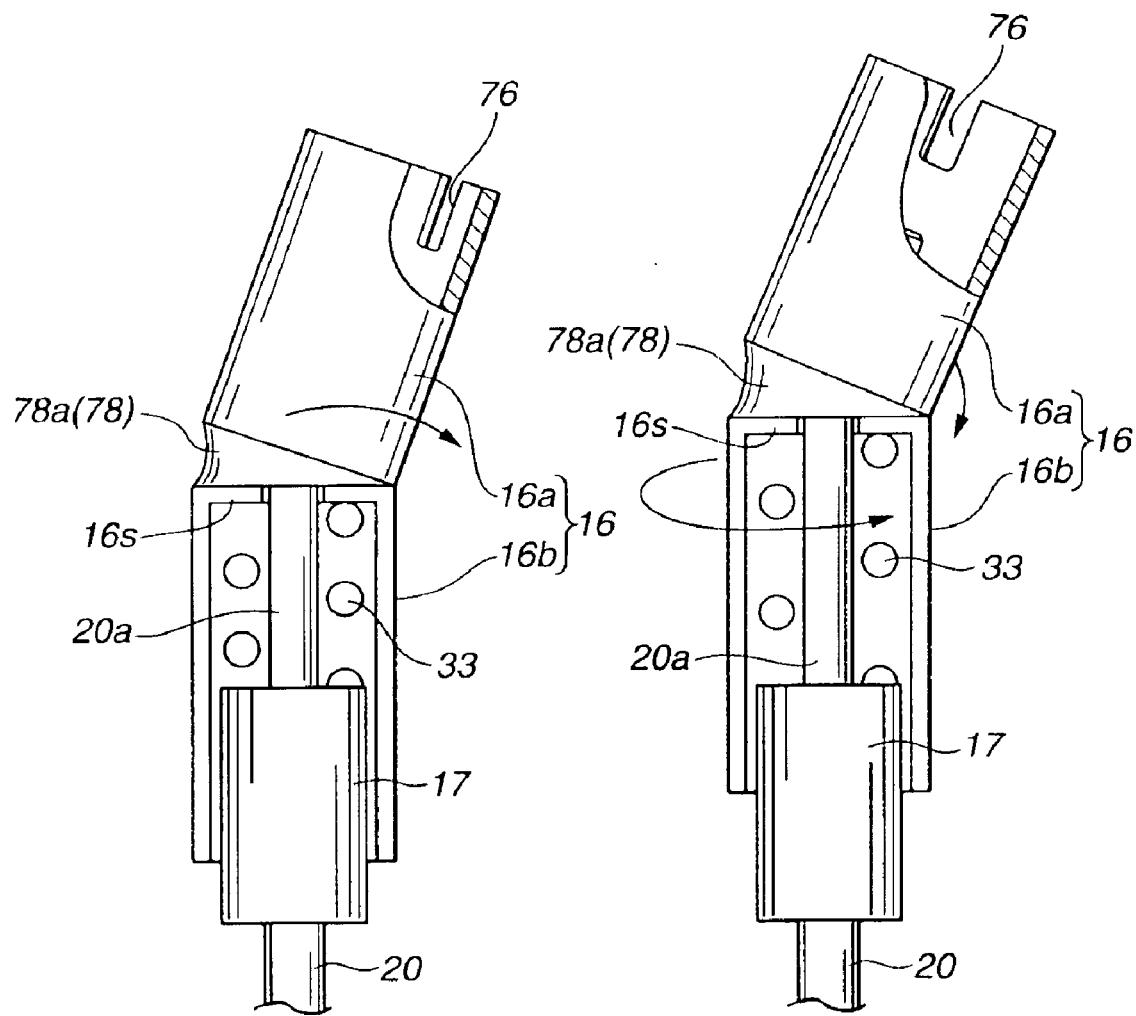
FIGS. 14A and 14B are views for illustrating inclination of the upper piece shown in FIG. 13.

FIGS. 13 and 14 (14A and 14B) show a main portion of a headrest apparatus according to a fourth embodiment of the present invention. The fourth embodiment is different from the third embodiment in the following points. In the other respects, the fourth embodiment is substantially identical to the third embodiment. Corresponding parts are given the same reference numerals, and repetitive explanation is omitted. In the fourth embodiment, the connecting member connecting upper and lower pieces 16a and 16b is an elastomeric member 78. Elastomeric member 78 of this example is annular, or in the form of a hollow cylinder having a diameter substantially equal to the diameter of upper and lower cylindrical pieces 16a and 16b. An upper end of elastomeric member 78 is bonded by vulcanization to the lower end of upper piece 16a, and a lower end of elastomeric member 78 is bonded by vulcanization to the upper end of lower unit 16b.

When outer cylinder 16 is moved upward, upper piece 16a slides upward along the inclined upper guide portion 72 of stay 20 as shown in FIG. 14A and thereby bends forward to a forward inclined posture as shown in FIG. 14B. Elastomeric member 78 allows this inclination of upper piece 16a by expanding easily on the elongated side. Elastomeric member 78 can be readily formed integrally as an integral part of upper and lower pieces 16a and 16b, so that the this arrangement of the third embodiment is suitable for mass production, and advantageous in size reduction and improvement in productivity.

Figure 15:
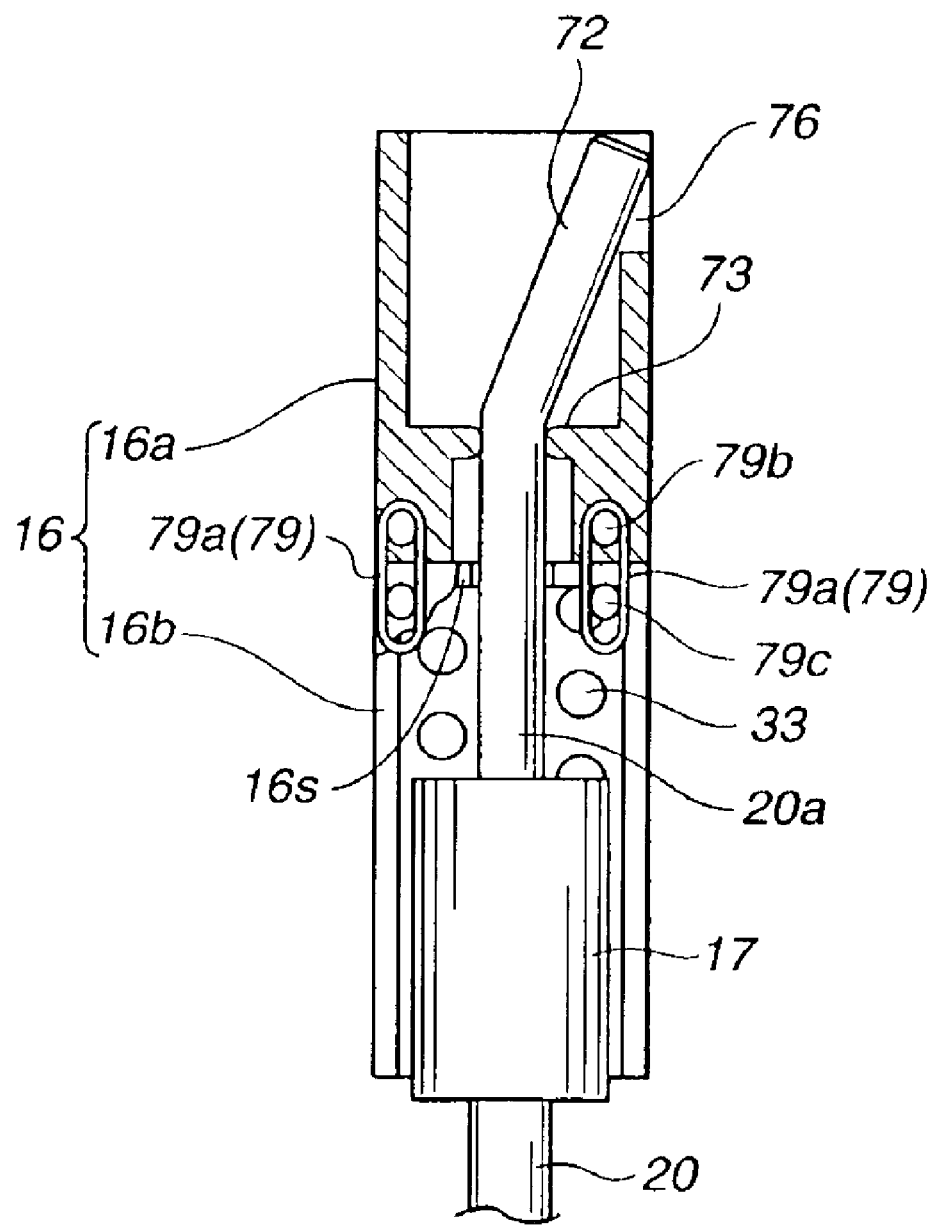
FIG. 15 is a sectional view showing a connecting structure between upper and lower pieces of an outer cylinder in a headrest apparatus according a fifth embodiment of the present invention.

FIGS. 15 and 16 (16A and 16B) show a main portion of a headrest apparatus according to a fifth embodiment of the present invention. The fifth embodiment is different from the third embodiment in the following points. In the other respects, the fifth embodiment is substantially identical to the third embodiment. In the fifth embodiment, the connecting member connecting upper and lower pieces 16a and 16b is a set of ring-shaped elastomer members 79 (or elastic bands). In the illustrated example, the ring-shaped elastomer members 79 are three rubber bands 79a. In the state of FIG. 15, each of rubber bands 79a extends vertically along the center line or axis of outer cylinder 16. In the illustrated example, three upper hooks 79b are arranged regularly around the outer circumference of upper piece 16a near the lower end of upper piece 16a, and projected outward. Similarly, three lower hooks 79c are arranged regularly around the outer circumference of lower piece 16b near the upper end of lower piece 16b, and projected outward. Each of three rubber bands 79a is stretched between the corresponding upper and lower hooks 79b and 79c confronting each other along the center line of outer cylinder 16.

When outer cylinder 16 is moved upward, upper piece 16a slides upward along the inclined upper guide portion 72 of stay 20 as shown in FIG. 16A and thereby bends forward to a forward inclined posture as shown in FIG. 16B. Rubber bands 79a allow this inclination of upper piece 16a by extending on the elongated side. This arrangement of the fifth embodiment is advantageous for size reduction and weight reduction of outer cylinder 16. Moreover, the use of rubber bands 79a is advantageous for cost reduction.

Figure 17:
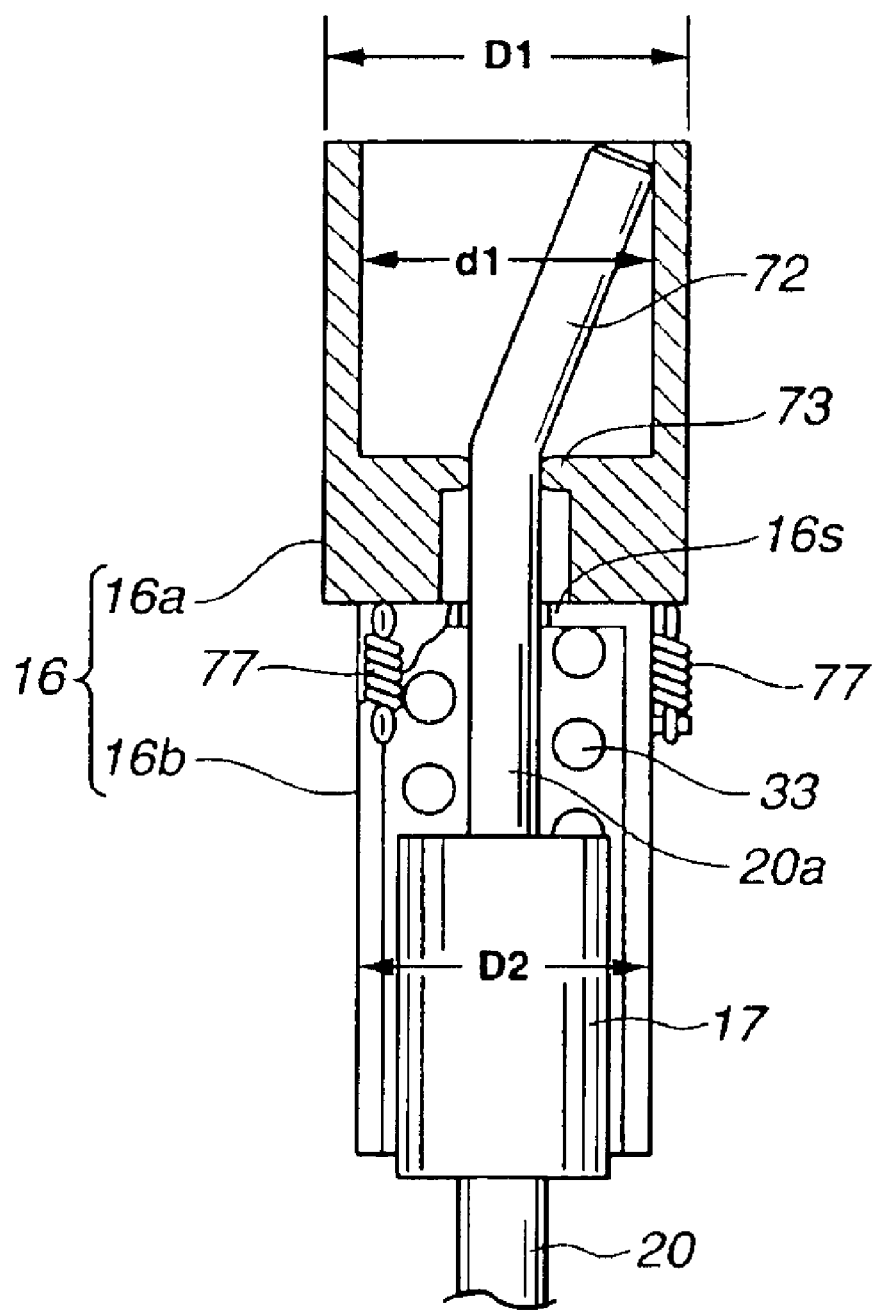
FIG. 17 is a sectional view showing a connecting structure between upper and lower pieces of an outer cylinder in a headrest apparatus according to a sixth embodiment of the present invention.

FIGS. 17 and 18 (18A and 18B) show a main portion of a headrest apparatus according to a sixth embodiment of the present invention. In most points, the sixth embodiment is substantially identical to the preceding embodiments. Corresponding parts are given the same reference numerals, and repetitive explanation is omitted. In the sixth embodiment, the inside diameter of upper cylindrical piece 16a on each side is greater than lower piece 16b.

In this example, the outside diameter D1 of upper piece 16a is greater than the outside diameter D2 of lower piece 16b, as shown in FIG. 17, so that the inside diameter d1 of upper piece 16a can be made sufficiently greater. Thus, the inside diameter d1 of upper piece 16a is greater than the inside diameter of lower piece 16b.

When outer cylinder 16 is moved upward, upper piece 16a slides upward along the inclined upper guide portion 72 of stay 20 as shown in FIG. 18A and thereby bends forward to a forward inclined posture as shown in FIG. 18B. In this case, upper piece 16a having the large inside diameter can allow the inclination of upper piece 16a without the need for notch or cutout such as recessed portion 76. It is possible to set the inclination angle or bend angle of upper guide portion 72 of stay 20 to a greater angle within the inside cylindrical space of upper piece 16a. This arrangement of the sixth embodiment makes it possible to increase the inclination angle of upper piece 16a and hence the inclination angle of thin flexible member 13 without requiring an additional operation for forming a cutout or recess.

In the six embodiments, it is possible to employ, as the connecting member for connecting upper and lower pieces 16a and 16b, any of various forms such as hinge 71 (shown in FIG. 1), springs 77 as shown in FIGS. 17 and 18, elastomeric member 78 (shown in FIG. 13) or rubber bands 79a (shown in FIG. 15).

In the illustrated embodiments, thin flexible member 13 and vertical end members 15 can serve as a head restraint member for restraining the head of a seat occupant. One or more of rotation urge mechanism 30, lift mechanism 31 and rotation mechanism 32 can serve as forward moving means for moving the head restraint member forward from a normal position to a forward position in case of a rear end collision. One or more of forward inclined guide portions 72, guide rings 73, the connection members such as item 71, 77, 78 or 79, and joints 74 can serve as inclining means for inclining the head restraint member forward during a forward movement of the head restraint member.

This application is based on a prior Japanese Patent Application No. 2001-397412. The entire contents of the prior Japanese Patent Application No. 2001-397412 with a filing date of Dec. 27, 2001 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A headrest apparatus for a vehicle, the headrest apparatus comprising:
    a headrest member to be mounted on top of a seatback of a vehicle seat, the headrest member including a head restraint section to restrain the head of a seat occupant;
    a forward move mechanism to move the head restraint section forward in case of a rear end collision of the vehicle, and thereby to shift forward a support point to support the head of the seat occupant against a rearward movement of the head of the seat occupant; and
    an inclining section to incline the head restraint section forward during a forward movement of the head restraint section caused by the forward move mechanism, by increasing an amount of a forward movement of an upper part of the head restraint section greater than an amount of a forward movement of a lower part of the head restraint section;

wherein the headrest member includes upper and lower members each of which extends forward from a rear end to a forward end when the head restraint section is moved forward by the forward move mechanism, the inclining section being arranged to incline the head restraint section forward by moving a rear end of the upper member forward.

2. The headrest apparatus as claimed in claim 1, wherein the headrest member includes a vertically extending member for supporting the headrest member on the seatback of the vehicle seat;

wherein the vertically extending member includes an upper piece supporting the upper part of the headrest member and a lower piece supporting the lower part of the headrest member; and wherein the inclining section is arranged to move the upper piece to move the rear end of the upper member forward.

3. The headrest apparatus as claimed in claim 2, wherein the upper piece is pivotally connected with the lower piece and arranged to incline forward.

4. The headrest apparatus as claimed in claim 1, wherein the inclining section is arranged to incline the head restraint section forward by moving the rear end of the upper member forward by an amount greater than any forward movement of a rear end of the lower member.

5. A headrest apparatus for a vehicle, the headrest apparatus comprising:

a headrest member to be mounted on top of a seatback of a vehicle seat, the headrest member including a head restraint section to restrain the head of a seat occupant;

a forward move mechanism to move the head restraint section forward in case of a rear end collision of the vehicle, and thereby to shift forward a support point to support the head of the seat occupant against a rearward movement of the head of the seat occupant; and an inclining section to incline the head restraint section forward during a forward movement of the head restraint section caused by the forward move mechanism, by increasing an amount of a forward movement of an upper part of the head restraint section greater than an amount of a forward movement of a lower part of the head restraint section;

wherein the headrest member comprises left and right half members each including a support end to be pivotally mounted on the seatback, and a swing end to be swung forward in case of a rear end collision of the vehicle;

wherein the head restraint section includes a thin flexible member arranged between the swing ends of the left and right half members, to spread with forward swing movement of the left and right half members, and thereby to restrain the head of the seat occupant; and wherein the inclining section is arranged to incline the flexible member by increasing the amount of a forward movement of an upper part of the flexible member greater than the amount of a forward movement of a lower part of the flexible member when the left and right half members are swung forward.

6. The headrest apparatus as claimed in claim 5, wherein the forward move mechanism includes a rotation urge mechanism to urge each of the left and right half members to swing forward and move upwards;

wherein the headrest apparatus further comprises:

a lock mechanism to lock the left and right half members and hold the left and right half members in an original position against an urging force of the rotation urge mechanism; and a control section to detect a rear end collision of the vehicle and unlock the lock mechanism in response to detection of the rear end collision to cause the left and right half members to move upwards and swing forward.

7. The headrest apparatus as claimed in claim 6, wherein each of the left and right half members comprises a pivot member which includes a lower piece, and an upper piece connected with an upper end of the lower piece through a connecting member to allow the upper piece to swing; and wherein the inclining section comprises left and right guide members to guide the upper pieces of the pivot members of the left and right half members, respectively, each of the left and right guide members including an upper guide portion inclined forward, and arranged to guide the upper piece of a corresponding one of the pivot members.

8. The headrest apparatus as claimed in claim 7, wherein the connecting member of each half member includes a hinge joining a lower end of the upper piece swingably with an upper end of the lower piece and allowing an upper end of the upper piece to swing forward.

9. The headrest apparatus as claimed in claim 7, wherein the connecting member of each half member includes an elastic member joining a lower end of the upper piece swingably with an upper end of the lower piece and allowing an upper end of the upper piece to swing forward.

10. The headrest apparatus as claimed in claim 9, wherein the elastic member of each half member includes a plurality of springs each including an upper spring end supported by the upper piece and a lower spring end supported by the lower piece, the upper spring ends of the springs being arranged around a center line of the upper piece, and the lower spring ends of the springs being arranged around a center line of the lower piece.

11. The headrest apparatus as claimed in claim 9, wherein the elastic member of each half member includes an elastomeric member including an upper elastomeric end fixed around the lower end of the upper piece, and a lower elastomeric end fixed around the upper end of the lower piece.

12. The headrest apparatus as claimed in claim 9, wherein the elastic member of each half member includes a plurality of elastomer bands each being connected between an upper hook fixed to the upper piece and a lower hook fixed to the lower piece, the upper hooks being arranged around a center line of the upper piece, and the lower hooks being arranged around a center line of the lower piece.

13. The headrest apparatus as claimed in claim 7, wherein the upper piece of each of the left and right half members includes a recessed portion to receive the upper guide portion of a corresponding one of the left and right guide members.

14. The headrest apparatus as claimed in claim 7, wherein each of the upper and lower pieces is in the form of a hollow cylinder, and the inside diameter of the upper pieces is greater than the lower pieces.

15. The headrest apparatus as claimed in claim 7, wherein the upper piece of each of the left and right half members is formed with an inside guide ring fit over a corresponding one of the left and right guide members, to guide an upward movement of the upper piece.

16. The headrest apparatus as claimed in claim 7, wherein each of the left and right guide members comprises a stay including a lower segment adapted to be fixed to the seatback and an upper segment extending upward in the pivot member and including the upper guide portion inclined forward.

17. The headrest apparatus as claimed in claim 16, wherein the rotation urge mechanism comprises a lift spring to move the pivot member upward along the stay, and a rotation member to rotate the pivot member about the stay by upward movement of the pivot member by the lift spring.

18. The headrest apparatus as claimed in claim 17, wherein the guide member comprises an inner cylinder fixedly mounted on the stay and formed with a helical groove, the lower piece of the pivot member is fit over the inner cylinder, and the rotation member is mounted on the lower piece of the pivot member and constrained to move in the helical groove to rotate the pivot member with respect to the inner cylinder.

19. The headrest apparatus as claimed in claim 7, wherein each of the left and right half members further comprises an upper lateral arm extending from a first arm end pivotally connected with the upper piece of the pivot member to a second arm end, a lower lateral arm extending from a first arm end pivotally connected with the lower piece of the pivot member, to a second arm end, and a vertical end member connected between the second arm ends of the upper and lower lateral arms, and arranged to wind one end portion of the thin flexible member.

20. A headrest apparatus for a vehicle, the headrest apparatus comprising:

a headrest member to be mounted on top of a seatback of a vehicle seat, the headrest member including left and right half members each including an outer end swingably mounted on a vertically extending mount member, and an inner end to be swung forward in case of a rear end collision of the vehicle;

a thin flexible member connected between the inner ends of the left and right half members, and arranged to be expanded to restrain the head of a seat occupant, by forward swing movement of the left and right half members; and an inclining mechanism to incline the thin flexible member forward during the forward swing movement of the left and right half members, by making an amount of a forward movement of an upper part of the thin flexible member greater than an amount of a forward movement of a lower part of the thin flexible member.

21. A headrest apparatus for a vehicle, the headrest apparatus comprising:

a head restraint member for restraining the head of a seat occupant;

forward moving means for moving the head restraint member forward from a normal position to a forward position in case of a rear end collision of the vehicle, to support the head of the seat occupant against a rearward movement of the head of the seat occupant at the forward point; and inclining means for inclining the head restraint member forward during a forward movement of the head restraint member caused by the forward move means, by increasing an amount of a forward movement of an upper part of the head restraint member greater than an amount of a forward movement of a lower part of the head restraint member;

wherein the forward moving means includes a lift mechanism for lifting the head restraint member upward, to cause the forward movement of the head restraint member and to cause an inclining movement of the head restraint member by the inclining means.

* * * * *